(12) United States Patent
He et al.

(10) Patent No.: US 9,081,486 B2
(45) Date of Patent: Jul. 14, 2015

(54) METHOD, DEVICE AND SYSTEM FOR ACQUIRING VIRTUAL KEYBOARD

(75) Inventors: Zhiqiang He, Shenzhen (CN); Chunhua Luo, Shenzhen (CN); Yuankun Zheng, Shenzhen (CN); Cheng Guo, Shenzhen (CN); Yu Tian, Shenzhen (CN); Liang Ma, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 0 days.

(21) Appl. No.: 13/981,510

(22) PCT Filed: Dec. 23, 2011

(86) PCT No.: PCT/CN2011/084513
§ 371 (c)(1),
(2), (4) Date: Aug. 15, 2013

(87) PCT Pub. No.: WO2012/100614
PCT Pub. Date: Aug. 2, 2012

(65) Prior Publication Data
US 2014/0047374 A1 Feb. 13, 2014

(30) Foreign Application Priority Data
Jan. 26, 2011 (CN) .......................... 2011 1 0028310

(51) Int. Cl.
*G06F 13/38* (2006.01)
*G06F 15/16* (2006.01)
*G06F 3/048* (2013.01)
*G06F 3/0484* (2013.01)

(52) U.S. Cl.
CPC .............. *G06F 3/0484* (2013.01); *G06F 3/048* (2013.01)

(58) Field of Classification Search
None
See application file for complete search history.

(56) References Cited

U.S. PATENT DOCUMENTS 7,030,890 B1 * 4/2006 Jouet et al. ..................... 345/619
8,667,412 B2 * 3/2014 Patryshev ...................... 715/773
(Continued)

FOREIGN PATENT DOCUMENTS

CN 101853136 A 10/2010
CN 101882047 A 11/2010

*Primary Examiner* — Michael Sun
(74) *Attorney, Agent, or Firm* — Lando & Anastasi, LLP

(57) ABSTRACT

Embodiments, relating to the field of virtual keyboard technologies, of the present invention provide a method for acquiring a virtual keyboard key. The method includes: receiving layout of a universal virtual keyboard and a mapping relationship between terminals and universal virtual keyboard key value mapping tables from a server; acquiring a corresponding universal virtual keyboard key value mapping table according to the identifier of the terminal and the mapping relationship between terminals and universal virtual keyboard key value mapping tables; and acquiring a universal virtual keyboard according to the layout of the universal virtual keyboard and the universal virtual keyboard key value mapping table of the terminal. According to the embodiments of the present invention, a universal virtual keyboard key value mapping table of a terminal is acquired according to the identifier of the terminal and a mapping relationship between terminals and universal virtual keyboard key value mapping tables, and a universal virtual keyboard is acquired according to layout of the universal virtual keyboard and the universal virtual keyboard key value mapping table of the terminal. In this way, virtual keyboards of different terminals have uniform user interface display, thereby reducing operation costs of users to adapt different virtual keyboards due to use of different terminals, and improving user experience.

29 Claims, 7 Drawing Sheets

(56) References Cited

U.S. PATENT DOCUMENTS

2008/0172735 A1* 7/2008 Gao et al. .................. 726/19
2011/0179372 A1* 7/2011 Moore et al. ............... 715/773
2011/0191591 A1* 8/2011 Cheng et al. ............... 713/182
2011/0320974 A1* 12/2011 Bai et al. ................... 715/773
2012/0290287 A1* 11/2012 Fux et al. ..................... 704/8
2013/0263039 A1* 10/2013 Fahlgren et al. ............ 715/780
2014/0101595 A1* 4/2014 Kumara et al. ............. 715/773

* cited by examiner

METHOD, DEVICE AND SYSTEM FOR ACQUIRING VIRTUAL KEYBOARD

This application is a National Stage Application under 35 U.S.C. §371 of PCT/CN2011/084513, filed Dec. 23, 2011, which claims priority to Chinese Patent Application No. 201110028310.0 filed Jan. 26, 2011.

FIELD OF THE INVENTION

The present invention relates to the field of virtual keyboard technologies, and in particular, to a method, device and system for acquiring a virtual keyboard.

BACKGROUND OF THE INVENTION

A virtual keyboard refers to a key-virtualized keyboard for use in a full-touch screen terminal. The virtual keyboard on the touch screen can be directly used as a physical keyboard. Standard keys, in combination with a plurality of function keys, form a physical keyboard and key value table to generate a virtual keyboard, so as to improve the method for data input.

In the prior art, information input by a user is acquired by using the virtual keyboard by the following steps: firstly, displaying corresponding virtual key according to preset keyboard state values; when a virtual key is pressed, acquiring the pressed virtual key information by using an input box widget, and acquiring a key value by querying a key value table; and invoking the corresponding input method according to the key value and the corresponding input method widget to generate text information.

During the implementation of the present invention, the inventors find that the prior art has at least the following problems:

Currently, virtual keyboard systems are various in types, and different terminals use different virtual keyboards. In this case, when a user uses a new terminal, the user needs to adapt to the virtual keyboard of the new terminal. As a result, the operation cost is increased for the user, and user experience is poor.

SUMMARY OF THE INVENTION

To reduce the operation cost for a user, an embodiment of the present invention provides a method for acquiring a virtual keyboard, where the method includes:

receiving layout of a universal virtual keyboard, and a mapping relationship between terminals and universal virtual keyboard key value mapping tables from a server;

acquiring a universal virtual keyboard key value mapping table of a terminal according to the identifier of the terminal, and the mapping relationship between terminals and universal virtual keyboard key value mapping tables; and acquiring a universal virtual keyboard according to the layout of the universal virtual keyboard, and the universal virtual keyboard key value mapping table of the terminal.

An embodiment of the present invention provides a method for sending a virtual keyboard, where the method includes:

acquiring a preset mapping relationship between terminals and universal virtual keyboard key value mapping tables; and sending the layout of the universal virtual keyboard and the mapping relationship between terminals and universal virtual keyboard key value mapping tables to a terminal to enable the terminal to acquire a corresponding universal virtual keyboard key value mapping table according to the identifier of the terminal and the mapping relationship between terminals and universal virtual keyboard key value mapping tables, and acquire a universal virtual keyboard according to the layout of the universal virtual keyboard and the universal virtual keyboard key value mapping table of the terminal.

An embodiment of the present invention provides another method for acquiring a virtual keyboard, where the method includes:

sending a universal virtual keyboard acquisition request, where the request carries the identifier of a terminal;

receiving layout of a universal virtual keyboard, and a universal virtual keyboard key value mapping table corresponding to the identifier of the terminal from a server; and acquiring a universal virtual keyboard according to the layout of the universal virtual keyboard, and the universal virtual keyboard key value mapping table of the terminal.

An embodiment of the present invention provides a method for sending a virtual keyboard, where the method includes:

receiving a universal virtual keyboard acquisition request from a terminal, where the request carries the identifier of the terminal;

querying the mapping relationship between terminal identifiers and universal virtual keyboard key value mapping tables according to the identifier of the terminal to acquire a universal virtual keyboard key value mapping table corresponding to the identifier of the terminal; and sending the layout of the universal virtual keyboard and the universal virtual keyboard key value mapping table corresponding to the identifier of the terminal to enable the terminal to acquire a universal virtual keyboard according to the layout of the universal virtual keyboard and the universal virtual keyboard key value mapping table of the terminal.

An embodiment of the present invention provides a terminal, where the terminal includes:

a virtual keyboard information receiving module, configured to receive layout of a universal virtual keyboard, and a mapping relationship between terminals and universal virtual keyboard key value mapping tables from a server;

a module for acquiring a universal virtual keyboard key value mapping table, configured to acquire a universal virtual keyboard key value mapping table of a terminal according to the identifier of the terminal and the mapping relationship between terminals and universal virtual keyboard key value mapping tables; and a universal virtual keyboard generating module, configured to acquire a universal virtual keyboard according to the layout of the universal virtual keyboard and the universal virtual keyboard key value mapping table of the terminal.

An embodiment of the present invention provides a server, where the server includes:

a mapping relationship acquiring module, configured to acquire a preset mapping relationship between terminals and universal virtual keyboard key value mapping tables; and a universal virtual keyboard information sending module, configured to send layout of a universal virtual keyboard and the mapping relationship between terminals and universal virtual keyboard key value mapping tables to a terminal to enable the terminal to acquire a corresponding universal virtual keyboard key value mapping table according to the identifier of the terminal and the mapping relationship between terminals and universal virtual keyboard key value mapping tables, and acquire a universal virtual keyboard according to the layout of the universal virtual keyboard and the universal virtual keyboard key value mapping table of the terminal An embodiment of the present invention provides a terminal, where the terminal includes:

a universal virtual keyboard acquisition request sending module, configured to send a request for acquiring a universal virtual keyboard, where the request carries the identifier of a terminal;

a universal virtual keyboard information receiving module, configured to receive layout of a universal virtual keyboard, and a universal virtual keyboard key value mapping table corresponding to the identifier of the terminal from a server; and a universal virtual keyboard generating module, configured to acquire a universal virtual keyboard according to the layout of the universal virtual keyboard and the universal virtual keyboard key value mapping table of the terminal.

An embodiment of the present invention provides a server, where the server includes:

a universal virtual keyboard acquisition request receiving module, configured to receive a request for acquiring a universal virtual keyboard from a terminal, where the request carries the identifier of the terminal;

a module for acquiring a universal virtual keyboard key value mapping table, configured to query a mapping relationship between terminal identifiers and universal virtual keyboard key value mapping tables according to the identifier of the terminal to acquire a universal virtual keyboard key value mapping table corresponding to the identifier of the terminal; and a universal virtual keyboard information sending module, configured to send layout of the universal virtual keyboard and the universal virtual keyboard key value mapping table corresponding to the identifier of the terminal to enable the terminal to acquire a universal virtual keyboard according to the layout of the universal virtual keyboard and the universal virtual keyboard key value mapping table of the terminal.

An embodiment of the present invention provides a system for acquiring a virtual keyboard, where the system includes a terminal and a server.

The terminal is configured to: receive layout of a universal virtual keyboard and a mapping relationship between terminals and universal virtual keyboard key value mapping tables from the server; acquire a corresponding universal virtual keyboard key value mapping table according to the identifier of the terminal and the mapping relationship between terminals and universal virtual keyboard key value mapping tables; and acquire a universal virtual keyboard according to the layout of the universal virtual keyboard and the universal virtual keyboard key value mapping table of the terminal.

The server is configured to: acquire a preset mapping relationship between terminals and universal virtual keyboard key value mapping tables; and send the layout of the universal virtual keyboard and the mapping relationship between terminals and universal virtual keyboard key value mapping tables to the terminal to enable the terminal to acquire a corresponding universal virtual keyboard key value mapping table according to the identifier of the terminal and the mapping relationship between terminals and universal virtual keyboard key value mapping tables.

According to the embodiments of the present invention, a universal virtual keyboard key value mapping table of a terminal is acquired according to the identifier of the terminal and a mapping relationship between terminals and universal virtual keyboard key value mapping tables, and a universal virtual keyboard is acquired according to layout of the virtual keyboard and the universal virtual keyboard key value mapping table of the terminal. In this way, virtual keyboards of different terminals have uniform user interface display, thereby reducing operation costs of users to adapt different virtual keyboards due to use of different terminals, and improving user experience.

BRIEF DESCRIPTION OF THE DRAWINGS

For a better understanding of the technical solutions in the embodiments of the present invention, the accompanying drawings for illustrating the embodiments are briefly described below. Apparently, the accompanying drawings in the following description illustrate only some embodiments of the present invention, and persons of ordinary skill in the art can derive other accompanying drawings from these accompanying drawings without any creative efforts.

DETAILED DESCRIPTION OF THE INVENTION

To make the objectives, technical solutions, and advantages of the present invention clearer, the embodiments of the present invention are described in detail below with reference to the accompanying drawings.

Embodiment 1

Figure 1:
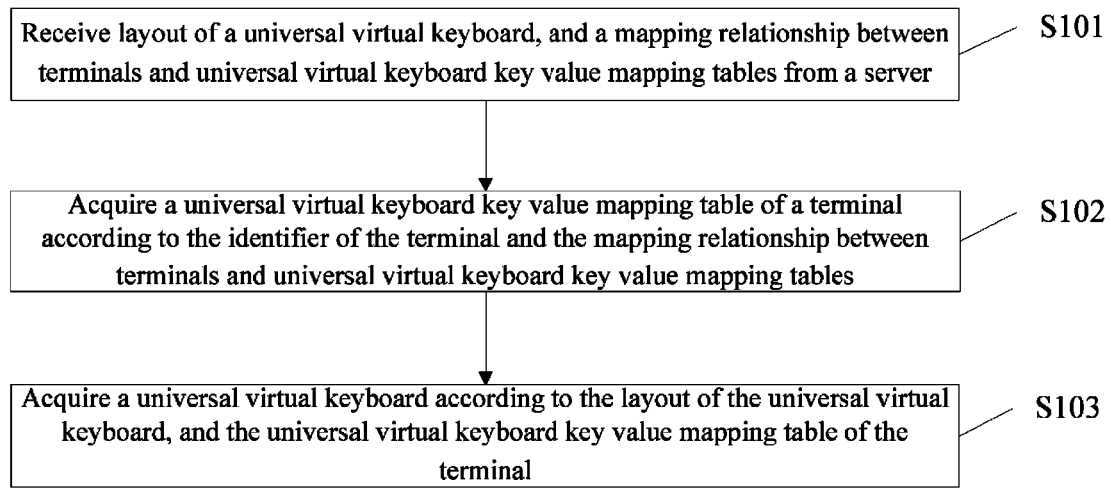
FIG. 1 is a flowchart of a method for acquiring a virtual keyboard according to Embodiment 1 of the present invention.

As illustrated in FIG. 1, this embodiment provides a method for acquiring a virtual keyboard, where the method includes:

S101: receiving layout of a universal virtual keyboard, and a mapping relationship between terminals and universal virtual keyboard key value mapping tables from a server;

S102: acquiring a universal virtual keyboard key value mapping table of a terminal according to the identifier of the terminal and the mapping relationship between terminals and universal virtual keyboard key value mapping tables; and S103: acquiring a universal virtual keyboard according to the layout of the universal virtual keyboard, and the universal virtual keyboard key value mapping table of the terminal.

Since the sending method and the acquiring method are two corresponding methods performed by two execution subjects, herein only the method for acquiring a virtual keyboard is described, and the method for sending a virtual keyboard has been embodied in the above acquiring method embodiments.

It should be noted that, steps in this embodiment may be either performed by a C++ language-compiled program module, or performed by a terminal with the program module loaded thereto.

According to the embodiments of the present invention, a universal virtual keyboard key value mapping table of a terminal is acquired according to the identifier of the terminal and a mapping relationship between terminals and universal virtual keyboard key value mapping tables, and a universal virtual keyboard is acquired according to layout of the virtual keyboard and the universal virtual keyboard key value mapping table of the terminal. In this way, virtual keyboards of different terminals have uniform user interface display, thereby reducing operation costs of users to adapt different virtual keyboards due to use of different terminals, and improving user experience.

Embodiment 2

Figure 2:
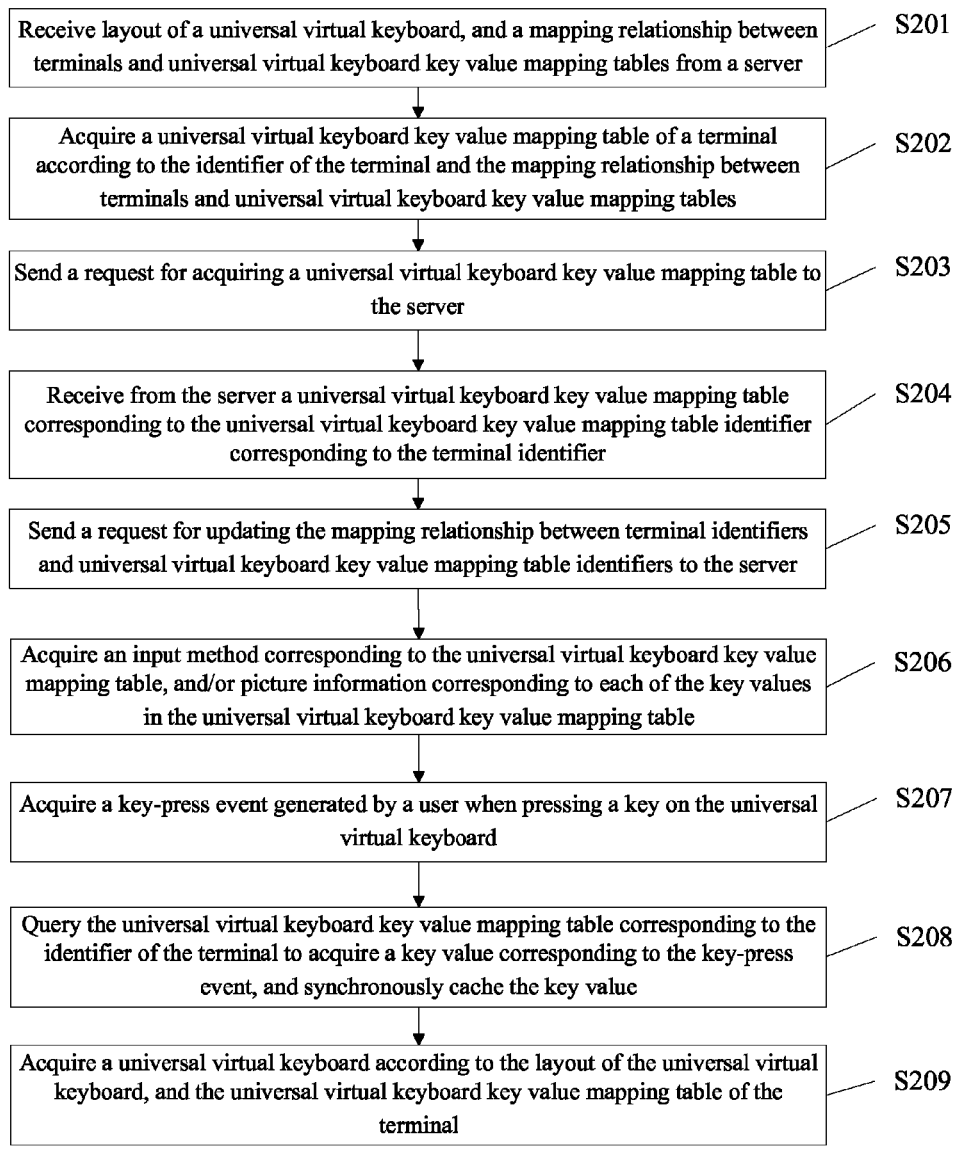
FIG. 2 is a flowchart of a method for acquiring a virtual keyboard according to Embodiment 2 of the present invention.

As illustrated in FIG. 2, this embodiment provides another method for acquiring a virtual keyboard, where the method includes:

S201: Receiving layout of a universal virtual keyboard, and a mapping relationship between terminals and universal virtual keyboard key value mapping tables from a server.

Specifically, after acquiring a preset mapping relationship between terminals and universal virtual keyboard key value mapping tables, the server sends the layout of the universal virtual keyboard, and the mapping relationship between terminals and universal virtual keyboard key value mapping tables to the terminal. The terminal receives the layout of the universal virtual keyboard, and the mapping relationship between terminals and universal virtual keyboard key value mapping tables.

The mapping relationship between terminals and universal virtual keyboard key value mapping tables may be generated by acquiring the terminals and universal virtual keyboard key value mapping tables and according to the virtual keyboard key value mapping tables, and the mapping relationship between the terminals and the universal virtual keyboard key value mapping tables may be pre-stored in the server.

For example, a mapping relationship between terminals and universal virtual keyboard key value mapping tables may be as shown in Table 1.

TABLE 1

| Terminal Identifier | Keyboard Key Value Mapping Table |
|---|---|
| A | a |
| B | b |
| C | c |
| ... | ... |

Optionally, the server sends an input method that is carried in and corresponding to the universal virtual keyboard key value mapping table, and/or picture information corresponding to each of the key values in the universal virtual keyboard key value mapping table to the terminal. In the prior art, the functions of input box widgets of terminals are simple, and graphical input cannot be implemented. Therefore, in this embodiment, picture information corresponding to the key value mapping table is included such that a user acquires the corresponding picture information by using keys. In this way, both text input and picture input are implemented by the user. In addition, when a terminal is installed with a plurality of input methods, coupling between the input method inherited in the terminal system and input methods loaded by the user may occur, thereby resulting in unknown errors. However, since the input method inherited in the terminal system is provided by the system, this type of error is uncontrollable for the user. Therefore, a corresponding input method is preset for the key value mapping table to replace the input method inherited in the terminal system, thereby preventing uncontrollable errors caused by different input methods in the terminal system.

Furthermore and optionally, the mapping relationship between terminals and universal virtual keyboard key value mapping tables may be specifically a mapping relationship between terminal identifiers and universal virtual keyboard key value mapping table identifiers, or a mapping relationship between terminal identifiers and universal virtual keyboard key value mapping tables.

S202: Acquiring the identifier of the terminal, and querying the mapping relationship between terminal identifiers and universal virtual keyboard key value mapping table identifiers according to the identifier of the terminal to acquire a universal virtual keyboard key value mapping table identifier corresponding to the identifier of the terminal.

Specifically, in step S201, when the mapping relationship between terminals and universal virtual keyboard key value mapping tables is a mapping relationship between terminal identifiers and universal virtual keyboard key value mapping table identifiers, the terminal acquires the identifier of the terminal itself, and queries the mapping relationship between terminal identifiers and universal virtual keyboard key value mapping table identifiers according to the identifier of the terminal to acquire a universal virtual keyboard key value mapping table identifier corresponding to the identifier of the terminal.

S203: Sending a request for acquiring a universal virtual keyboard key value mapping table to the server.

Specifically, the terminal sends a request for acquiring a universal virtual keyboard key value mapping table to the server, where the request carries the universal virtual keyboard key value mapping table identifier corresponding to the identifier of the terminal.

S204: Receiving a universal virtual keyboard key value mapping table corresponding to the universal virtual keyboard key value mapping table identifier corresponding to the identifier of the terminal from the server.

Specifically, after receiving the request for acquiring a universal virtual keyboard key value mapping table, the server sends a universal virtual keyboard key value mapping table corresponding to the universal virtual keyboard key value mapping table identifier to the terminal.

S205: Sending a request for updating the mapping relationship between terminal identifiers and universal virtual keyboard key value mapping table identifiers to the server.

Specifically, this step is an optional step. The terminal sends a request for updating the mapping relationship between terminal identifiers and universal virtual keyboard key value mapping table identifiers to the server. When an updated mapping relationship between terminals and universal virtual keyboard key value mapping table identifiers is available in the server, the server sends the updated mapping relationship between terminals and universal virtual keyboard key value mapping table identifiers to the terminal so that the terminal replaces a locally stored mapping relationship between terminals and universal virtual keyboard key value mapping table identifiers with the updated mapping relationship between terminals and universal virtual keyboard key value mapping table identifiers.

S206: Acquiring an input method that is carried in and corresponding to the universal virtual keyboard key value mapping table, and/or picture information corresponding to each of the key values in the universal virtual keyboard key value mapping table.

S206 is an optional operation. The specific implementation mode has been described in S201, which is not described herein any further.

Optionally, after this step, S207 and S208 may also be performed.

S207: Acquiring a key-press event generated by a user when pressing a key on the universal virtual keyboard.

S208: Querying the universal virtual keyboard key value mapping table corresponding to the identifier of the terminal to acquire a key value corresponding to the key-press event, and synchronously caching the key value.

Specifically, since platforms used by the terminals vary, the manners of acquiring key-press events are different. To prevent "frame jumping" caused because the key-press event operation performed by a user is quicker than the frequency of screen refreshing, the user key needs to be synchronously cached, thereby preventing key-press loss.

The key values are synchronously cached in the following way: performing an "AND" operation for the currently acquired pressed key values and the cached key values to ensure that all pressed keys are captured, that is: KeyDownState=aKey & KeyDownState. If a key value is to be cleared, an "AND" operation after a NEGATE operation is only needed, which does not affect other key values. That is: KeyDownState &=~aKey, where "&" represents an "AND" operation and "~" represents a negate operation.

For example, each bit of 0x01-0x14 is used to represent a key value. In this way, 16 bits of 2 bytes can store 16 types of key values. For example, it is arranged that 1<<0x01 represents the numeric key "0", and 1<<0x11 represents the OK key, and the rest may be deduced likewise.

In formula KeyDownState=aKey & KeyDownState, aKey represents any pressed key value of KEY_0KEY_BACKSPACE, and KeyDownState is used to store variables of the user keys. As long as a key-press operation is performed, an "AND" operation is performed for aKey and KeyDownState. In the operation result, number "1" in a bit indicates that a key-press event of a type is generated, and number "0" in a bit indicates no key-press event of a type is generated. When a key is to be cleared, only a NEGATE operation needs to be performed for KeyDownState.

```
// key mask
    KEY_0 = 1 << 0x01, (representing numeric key "0")
    KEY_1 = 1 << 0x02, (representing numeric key "1")
    KEY_2 = 1 << 0x03, (representing numeric key "2")
    KEY_3 = 1 << 0x04, (representing numeric key "3")
    KEY_4 = 1 << 0x05, (representing numeric key "4")
    KEY_5 = 1 << 0x06, (representing numeric key "5")
    KEY_6 = 1 << 0x07, (representing numeric key "6")
    KEY_7 = 1 << 0x08, (representing numeric key "7")
    KEY_8 = 1 << 0x09, (representing numeric key "8")
    KEY_9 = 1 << 0x0A, (representing numeric key "9")
    KEY_STAR = 1 << 0x0B, (representing star key "*")
    KEY_POUND = 1 << 0x0C, (representing pound key "#")
    KEY_UP = 1 << 0x0D, (representing up arrow key "↑")
    KEY_DOWN = 1 << 0x0E, (representing down arrow key "↓")
    KEY_LEFT = 1 << 0x0F, (representing left arrow key "←")
    KEY_RIGHT = 1 << 0x10, (representing right arrow key "→")
    KEY_OK = 1 << 0x11, //fire key (represent key "OK")
    KEY_RSELECT = 1 << 0x12, //left or right soft key
(representing right soft key)
    KEY_LSELECT = 1 << 0x13, //left or right soft key
(representing left soft key)
    KEY_BACKSPACE = 1 << 0x14 //delete key (representing delete key)
```

Key buffering involves three events: KeyDown, KeyUp, and KeyRepeated.

When a key is pressed, a KeyDown event is generated. Assume that keyCode, the code for the pressed key is stored in KeyDownState, only an "AND" operation needs to be performed for keyCode and KeyDownState.

When a key pops up, a KeyUp event is generated. Assume that keyCode, the code for the pressed key is stored in KeyUpState, only an "AND" operation needs to be performed for keyCode and KeyUpState.

When a key is pressed and held, a KeyRepeated event is generated. Assume that keyCode, the code for the pressed key is stored in KeyRepeatedState, only an "AND" operation needs to be performed for keyCode and KeyRepeatedState to cache a key value, instead of constantly storing the same key value.

In addition, when a user presses several keys simultaneously, an "AND" operation is performed for the simultaneously pressed keys. Each of the keys represents a key value. "0" or "1" is used to indicate whether a key is pressed. If several keys are simultaneously pressed, a corresponding number of "11" are used and meanwhile an "AND" operation is performed therefor.

S209: Acquiring a universal virtual keyboard according to the layout of the virtual keyboard, and the universal virtual keyboard key value mapping table of the terminal.

Specifically, the terminal uses the universal virtual keyboard according to the layout of the virtual board and the universal virtual keyboard key value mapping table of the terminal, and the input method corresponding to the universal virtual keyboard key value mapping table, and/or picture information corresponding to each of the key values in the universal virtual keyboard key value mapping table.

Optionally, after the key value is cached, according to a distribution relationship of the key value mapping table, the key value of "0" is subtracted from the current pressed key value to acquire the value of the current pressed key, and then a corresponding element in subscript is found from a mapping table array. That is, since the key value mapping table stores ASCII code values, during actual storage, it is only necessary to subtract the ASCII value of "0" from the corresponding key value. In this way, the corresponding key value is read.

It should be noted that, steps in this embodiment may be either performed by a C++ language-compiled program module, or performed by a terminal with the program module loaded thereto.

Since the sending method and the acquiring method are two corresponding methods performed by two execution subjects, herein only the method for acquiring a virtual keyboard is described, and the method for sending a virtual keyboard has been embodied in the above acquiring method embodiments.

According to the embodiments of the present invention, a terminal acquires a universal virtual keyboard key value mapping table of the terminal according to the identifier of the terminal and a mapping relationship between terminals and universal virtual keyboard key value mapping tables, and acquires a universal virtual keyboard according to layout of the virtual keyboard and the universal virtual keyboard key value mapping table of the terminal. In this way, virtual keyboards of different terminals have uniform user interface, thereby reducing operation costs of users to adapt different virtual keyboards due to use of different terminals, and improving user experience. Furthermore, the server directly pushes the identifier of the terminal and the universal virtual keyboard key value mapping table identifier to the terminal such that the terminal queries the mapping relationship between terminal identifiers and universal virtual keyboard key value mapping table identifiers according to the identifier of the terminal to acquire a universal virtual keyboard key value mapping table identifier corresponding to the identifier of the terminal; and sends, according to the universal virtual keyboard key value mapping table identifier, a request for acquiring a universal virtual keyboard key value mapping table to the server to acquire a corresponding universal virtual keyboard key value mapping table. In this way, it is unnecessary to store universal virtual keyboard key value mapping tables of other terminals, thereby saving storage space, and increasing efficiency in acquiring a universal virtual keyboard by the terminal. Still furthermore, according to the embodiments of the present invention, the locally stored identifier of the terminal and mapping relationship between terminals and universal virtual keyboard key value mapping tables are updated such that the terminal can acquire a latest universal virtual keyboard key value mapping table, thereby improving user experience.

Embodiment 3

Figure 3:
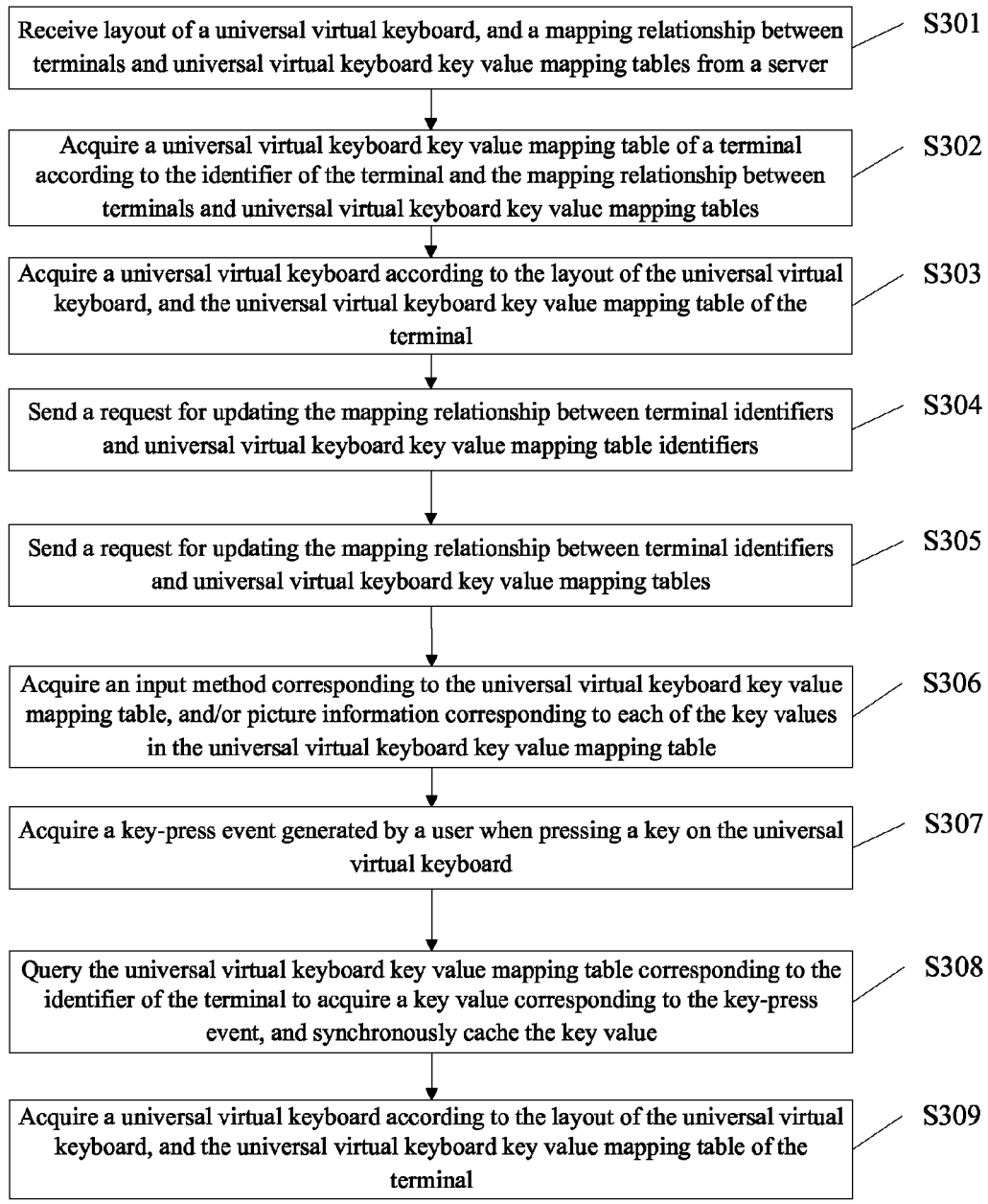
FIG. 3 is a flowchart of a method for acquiring a virtual keyboard according to Embodiment 3 of the present invention.

As shown in FIG. 3, this embodiment provides a method for acquiring a virtual keyboard, including steps S301-S309. Steps S306-S309 as the same as steps S206-S209, and the specific steps and drawings can refer to Embodiment 2, which are not described herein any further. Different from Embodiment 2, this embodiment further includes steps S301-S305.

S301: Receiving layout of a universal virtual keyboard, and a mapping relationship between terminals and universal virtual keyboard key value mapping tables from a server.

Specifically, after acquiring a preset mapping relationship between terminals and universal virtual keyboard key value mapping tables, the server sends the layout of the universal virtual keyboard, and the mapping relationship between terminals and universal virtual keyboard key value mapping tables. The terminal receives the layout of the universal virtual keyboard, and the mapping relationship between terminals and universal virtual keyboard key value mapping tables.

The universal virtual keyboard key value mapping table may be generated by acquiring the preset mapping relationship between terminals and universal virtual keyboard key value mapping tables and according to the universal virtual keyboard key value mapping table, and the mapping relationship between the terminal and the universal virtual keyboard key value mapping table may be pre-stored in the server.

Optionally, the mapping relationship between terminals and universal virtual keyboard key value mapping tables may be specifically a mapping relationship between terminal identifiers and universal virtual keyboard key value mapping table identifiers, or a mapping relationship between terminal identifiers and universal virtual keyboard key value mapping tables.

Furthermore and optionally, the server sends an input method that is carried in and corresponding to the universal virtual keyboard key value mapping table, and/or picture information corresponding to each of the key values in the universal virtual keyboard key value mapping table to the terminal.

302: Acquiring the identifier of the terminal, and querying the mapping relationship between terminal identifiers and universal virtual keyboard key value mapping tables according to the identifier of the terminal to acquire a universal virtual keyboard key value mapping table corresponding to the identifier of the terminal.

Specifically, in step S301, when the mapping relationship between terminals and universal virtual keyboard key value mapping tables is optionally and specifically a mapping relationship between terminal identifiers and universal virtual keyboard key value mapping tables, the terminal acquires the identifier of the terminal, and queries the mapping relationship between terminal identifiers and universal virtual keyboard key value mapping tables according to the identifier of the terminal to acquire a universal virtual keyboard key value mapping table corresponding to the identifier of the terminal.

S303: Acquiring a universal virtual keyboard according to the layout of the virtual keyboard, and the universal virtual keyboard key value mapping table of the terminal.

Specifically, the terminal acquires a universal virtual keyboard according to the layout of the virtual keyboard, and the universal virtual keyboard key value mapping table of the terminal.

S304: Sending a request for updating the mapping relationship between terminal identifiers and universal virtual keyboard key value mapping table identifiers.

Specifically, this step is an optional step. The terminal sends a request for updating the mapping relationship between terminal identifiers and universal virtual keyboard key value mapping tables identifiers. The server receives the request for updating the mapping relationship between terminal identifiers and universal virtual keyboard key value mapping tables identifiers from the terminal.

S305: Sending a request for updating the mapping relationship between terminal identifiers and universal virtual keyboard key value mapping tables.

Specifically, this step is an optional step. The terminal sends a request for updating the mapping relationship between terminal identifiers and universal virtual keyboard key value mapping tables to the server. When an updated mapping relationship between terminals and universal virtual keyboard key value mapping tables is available in the server, the server sends the updated mapping relationship between terminals and universal virtual keyboard key value mapping tables to the terminal to enable the terminal to replace a locally stored mapping relationship between terminals and universal virtual keyboard key value mapping tables with the updated mapping relationship between terminals and universal virtual keyboard key value mapping tables.

It should be noted that, steps in this embodiment may be either performed by a C++ language-compiled program module, or performed by a terminal with the program module loaded thereto.

Since the sending method and the acquiring method are two corresponding methods performed by two execution subjects, herein only the method for acquiring a virtual keyboard is described, and the method for sending a virtual keyboard has been described in the above method embodiments.

According to the embodiments of the present invention, a terminal acquires a universal virtual keyboard key value mapping table of the terminal according to the identifier of the terminal and a mapping relationship between terminals and universal virtual keyboard key value mapping tables, and acquires a universal virtual keyboard according to layout of the virtual keyboard and the universal virtual keyboard key value mapping table of the terminal. In this way, virtual keyboards of different terminals have uniform user interface, thereby reducing operation costs of users to adapt different virtual keyboards due to use of different terminals, and improving user experience. Furthermore, the server directly pushes the mapping relationship between identifier of the terminal and the universal virtual keyboard key value mapping table to the terminal such that the terminal queries the mapping relationship between terminal identifiers and universal virtual keyboard key value mapping table according to the identifier of the terminal to acquire a universal virtual keyboard key value mapping table identifier corresponding to the identifier of the terminal. In this way, it is unnecessary to store universal virtual keyboard key value mapping tables of other terminals, thereby the number of attempts to establishing communication between the terminal and the server is reduced, thereby saving communication traffic. Still furthermore, according to the embodiments of the present invention, the locally stored identifier of the terminal and mapping relationship between terminals and universal virtual keyboard key value mapping tables are updated such that the terminal can acquire a latest universal virtual keyboard key value mapping table, thereby improving user experience.

Embodiment 4

Figure 4:
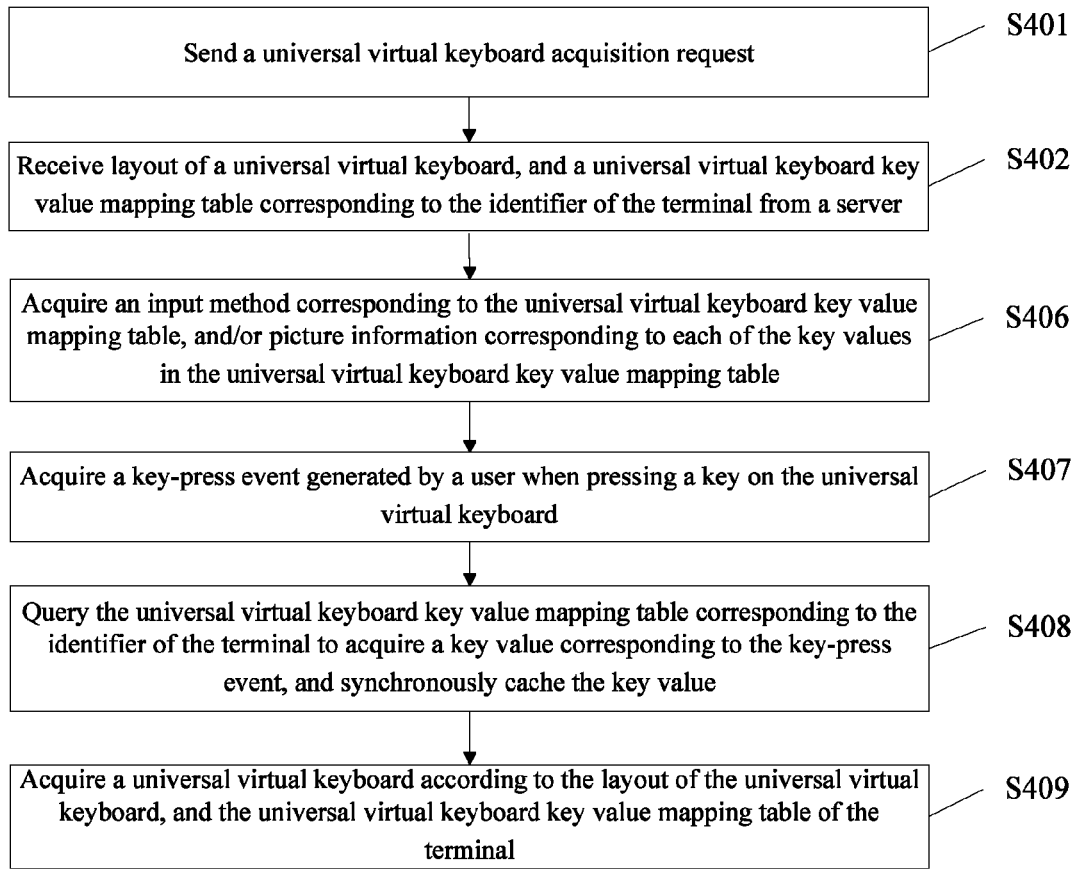
FIG. 4 is a flowchart of a method for acquiring a virtual keyboard according to Embodiment 4 of the present invention.

As shown in FIG. 4, this embodiment provides a method for acquiring a virtual keyboard, including steps S401-S406. Steps S403-S406 as the same as steps S206-S209, and the specific steps and drawings can refer to Embodiment 2, which are not described herein any further. Different from Embodiment 2, this embodiment further includes steps S401-S402.

S401: Sending a universal virtual keyboard acquisition request.

Specifically, a terminal sends a universal virtual keyboard acquisition request to a server, where the request carries the identifier of the terminal; after receiving universal virtual keyboard acquisition request from the terminal, the server queries a mapping relationship between terminal identifiers and universal virtual keyboard key value mapping table identifiers according to the identifier of the terminal to acquire a universal virtual keyboard key value mapping table identifier corresponding to the identifier of the terminal, and sends a universal virtual keyboard key value mapping table corresponding to the identifier of the terminal to the terminal.

Optionally, the server sends an input method that is carried in and corresponding to the universal virtual keyboard key value mapping table, and/or picture information corresponding to each of the key values in the universal virtual keyboard key value mapping table to the terminal.

S402: Receiving layout of a universal virtual keyboard, and a universal virtual keyboard key value mapping table corresponding to the identifier of the terminal from the server.

Specifically, the terminal receives layout of a universal virtual keyboard, and a universal virtual keyboard key value mapping table corresponding to the identifier of the terminal from the server.

Since the sending method and the acquiring method are two corresponding methods performed by two execution subjects, the method for sending a virtual keyboard has been embodied in the above acquiring method embodiments, which is not described herein any further.

According to the embodiments of the present invention, a terminal directly sends the identifier of the terminal to a server, and the server sends a universal virtual keyboard key value mapping table corresponding to the identifier of the terminal to the terminal. In this way, the number of attempts to establishing communication between the terminal and the server is reduced, thereby saving communication traffic, and improving user experience.

Embodiment 5

Figure 5:
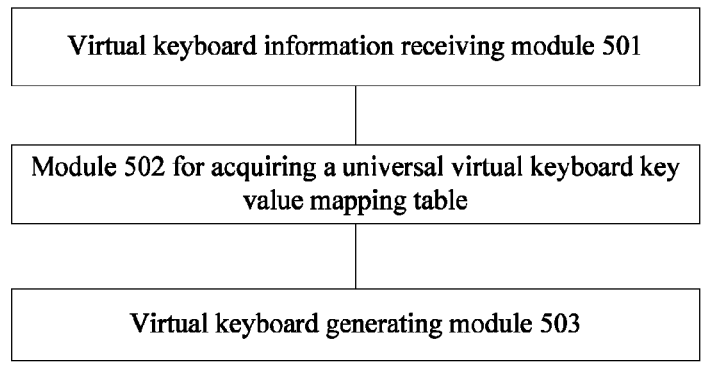
FIG. 5 is a schematic structural diagram of a terminal according to Embodiment 5 of the present invention.

As illustrated in FIG. 5, this embodiment provides a terminal, where the terminal includes:

a virtual keyboard information receiving module 501, configured to receive layout of a universal virtual keyboard, and a mapping relationship between terminals and universal virtual keyboard key value mapping tables from a server;

a module 502 for acquiring a universal virtual keyboard key value mapping table, configured to acquire a universal virtual keyboard key value mapping table of a terminal according to the identifier of the terminal and the mapping relationship between terminals and universal virtual keyboard key value mapping tables; and a universal virtual keyboard generating module 503, configured to acquire a universal virtual keyboard according to the layout of the universal virtual keyboard and the universal virtual keyboard key value mapping table of the terminal.

According to the embodiments of the present invention, a universal virtual keyboard key value mapping table of a terminal is acquired according to the identifier of the terminal and a mapping relationship between terminals and universal virtual keyboard key value mapping tables, and a universal virtual keyboard is acquired according to layout of the virtual keyboard and the universal virtual keyboard key value mapping table of the terminal. In this way, virtual keyboards of different terminals have uniform user interface display, thereby reducing operation costs of users to adapt different virtual keyboards due to use of different terminals, and improving user experience.

The terminal provided in this embodiment is based on the same inventive concept as the method embodiment 1. Therefore, the detailed implementation can refer to the description of the method embodiments of the present invention, which is not described herein any further.

A person skilled in the art should understand that all or part of steps of the preceding methods may be implemented by hardware or hardware following instructions of programs. The programs may be stored in a computer readable storage medium. The storage medium may be a read only memory, a magnetic disk, or a compact disc-read only memory.

Embodiment 6

Figure 6:
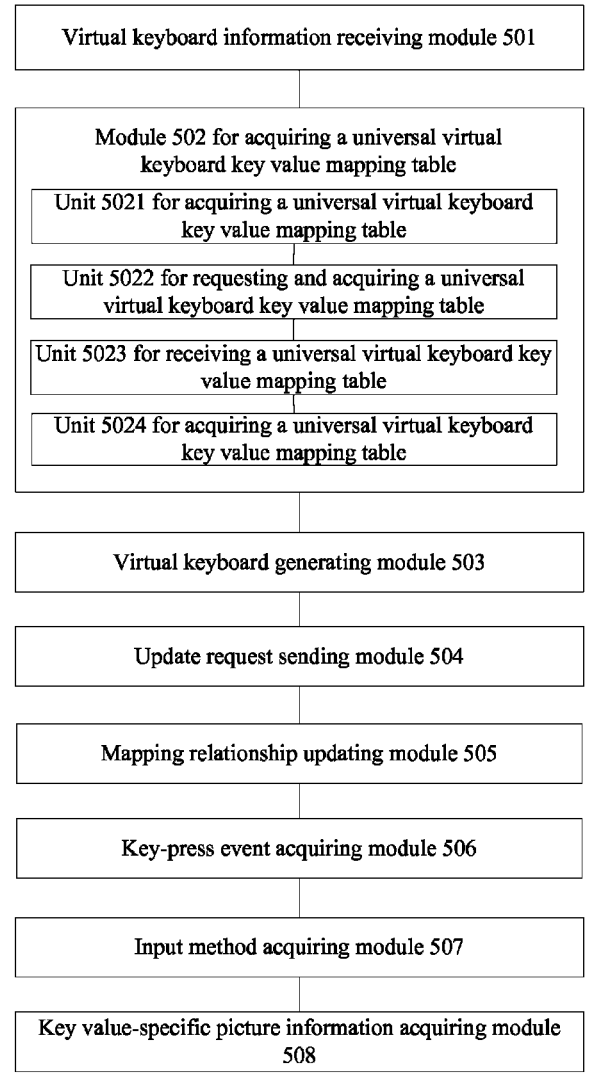
FIG. 6 is a schematic structural diagram of a terminal according to Embodiment 6 of the present invention.

As illustrated in FIG. 6, this embodiment provides a terminal, where the terminal includes: a virtual keyboard information receiving module 501, a universal virtual keyboard key value mapping table acquiring module 502, and a virtual keyboard generating module 503 according to Embodiment 5.

When the mapping relationship between terminals and universal virtual keyboard key value mapping tables is specifically a mapping relationship between terminal identifiers and universal virtual keyboard key value mapping table identifiers, the module 502 for acquiring a universal virtual keyboard key value mapping table specifically includes:

a unit 5021 for acquiring a universal virtual keyboard key value mapping table identifier, configured to acquire the identifier of the terminal, and query the mapping relationship between terminal identifiers and universal virtual keyboard key value mapping table identifiers according to the identifier of the terminal to acquire a universal virtual keyboard key value mapping table identifier corresponding to the identifier of the terminal;

a unit 5022 for requesting and acquiring a universal virtual keyboard key value mapping table, configured to send a request for acquiring a universal virtual keyboard key value mapping table to the server, wherein the request carries the universal virtual keyboard key value mapping table identifier corresponding to the identifier of the terminal; and a unit 5023 for receiving a universal virtual keyboard key value mapping table, configured to receive a universal virtual keyboard key value mapping table corresponding to the universal virtual keyboard key value mapping table identifier corresponding to the identifier of the terminal from the server.

When the mapping relationship between terminals and universal virtual keyboard key value mapping tables is specifically a mapping relationship between terminal identifiers and universal virtual keyboard key value mapping tables, the module 502 for acquiring a universal virtual keyboard key value mapping table specifically includes:

a unit 5024 for acquiring a universal virtual keyboard key value mapping table, configured to acquire the identifier of the terminal, and query the mapping relationship between terminal identifiers and universal virtual keyboard key value mapping tables according to the identifier of the terminal to acquire a universal virtual keyboard key value mapping table corresponding to the identifier of the terminal.

The terminal further includes:

an update request sending module 504, configured to send a request for updating the mapping relationship between terminals and universal virtual keyboard key value mapping tables;

a mapping relationship updating module 505, configured to receive an updated mapping relationship between terminals and universal virtual keyboard key value mapping tables from the server, and replace a locally stored mapping relationship between terminals and universal virtual keyboard key value mapping tables with the updated mapping relationship between terminals and universal virtual keyboard key value mapping tables;

a key-press event acquiring module 506, configured to acquire a key-press event generated by a user when pressing a key on the universal virtual keyboard;

a key value caching module, configured to query the universal virtual keyboard key value mapping table corresponding to the identifier of the terminal to acquire a key value corresponding to the key-press event, and synchronously cache the key value;

an input method acquiring module 507, configured to acquire an input method that is carried in and corresponding to the universal virtual keyboard key value mapping table; and/or and/or a key value-specific picture information acquiring module 508, configured to acquire picture information corresponding to each of the key values in the universal virtual keyboard key value mapping table.

According to the embodiments of the present invention, a terminal acquires a universal virtual keyboard key value mapping table of the terminal according to the identifier of the terminal and a mapping relationship between terminals and universal virtual keyboard key value mapping tables, and acquires a universal virtual keyboard according to layout of the virtual keyboard and the universal virtual keyboard key value mapping table of the terminal. In this way, virtual keyboards of different terminals have uniform user interface display, thereby reducing operation costs of users to adapt different virtual keyboards due to use of different terminals, and improving user experience. Furthermore, the server directly pushes the identifier of the terminal and the universal virtual keyboard key value mapping table identifier to the terminal such that the terminal queries the mapping relationship between terminal identifiers and universal virtual keyboard key value mapping table identifiers according to the identifier of the terminal to acquire a universal virtual keyboard key value mapping table identifier corresponding to the identifier of the terminal; and sends, according to the universal virtual keyboard key value mapping table identifier, a request for acquiring a universal virtual keyboard key value mapping table to the server to acquire a corresponding universal virtual keyboard key value mapping table. In this way, it is unnecessary to store universal virtual keyboard key value mapping tables of other terminals, thereby saving storage space, and increasing efficiency in acquiring a universal virtual keyboard by the terminal. Still furthermore, according to the embodiments of the present invention, the locally stored identifier of the terminal and mapping relationship between terminals and universal virtual keyboard key value mapping tables are updated such that the terminal can acquire a latest universal virtual keyboard key value mapping table, thereby improving user experience.

The terminal provided in this embodiment is based on the same inventive concept as the method embodiment 2. Therefore, the detailed implementation can refer to the description of the method embodiments of the present invention, which is not described herein any further.

A person skilled in the art should understand that all or part of steps of the preceding methods may be implemented by hardware or hardware following instructions of programs. The programs may be stored in a computer readable storage medium. The storage medium may be a read only memory, a magnetic disk, or a compact disc-read only memory.

Embodiment 7

Figure 7:
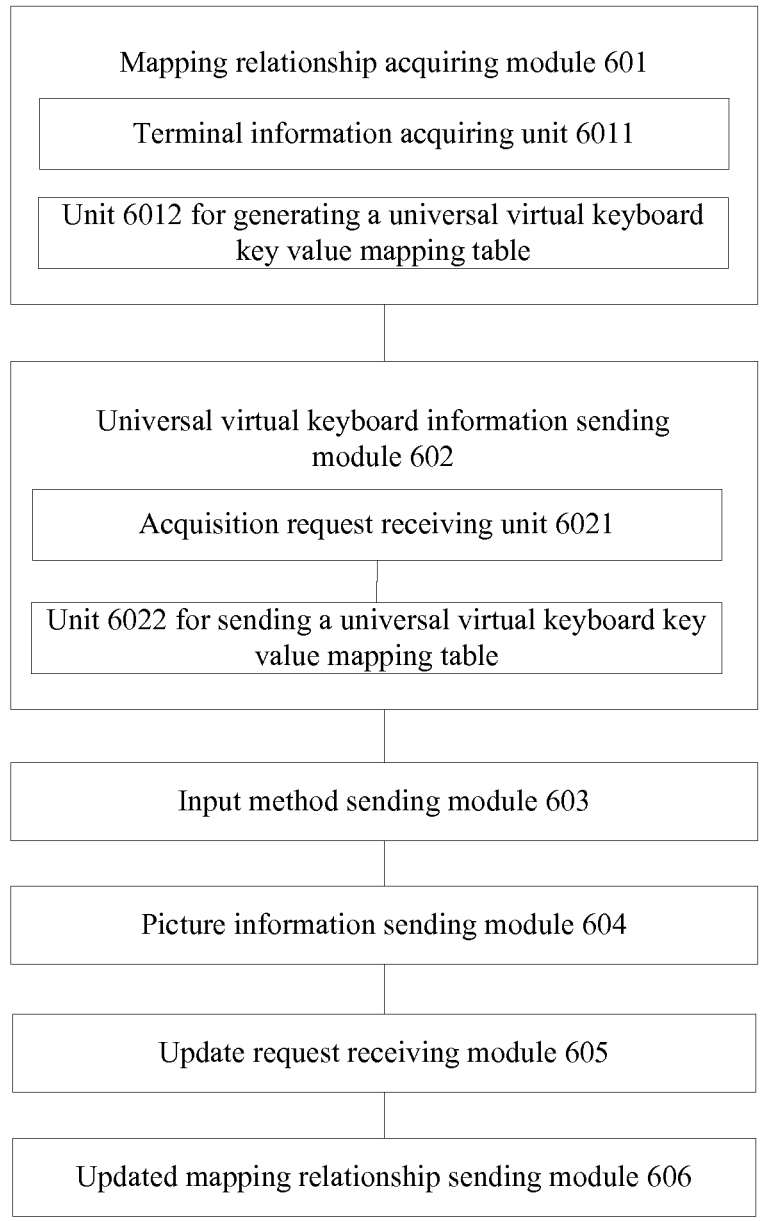
FIG. 7 is a schematic structural diagram of a server according to Embodiment 7 of the present invention.

As illustrated in FIG. 7, this embodiment provides a server, where the server includes:

a mapping relationship acquiring module 601, configured to acquire a preset mapping relationship between terminals and universal virtual keyboard key value mapping tables; and a universal virtual keyboard information sending module 602, configured to send layout of a universal virtual keyboard and the mapping relationship between terminals and universal virtual keyboard key value mapping tables to a terminal to enable the terminal to acquire a corresponding universal virtual keyboard key value mapping table according to the identifier of the terminal and the mapping relationship between terminals and universal virtual keyboard key value mapping tables, and acquire a universal virtual keyboard according to the layout of the universal virtual keyboard and the universal virtual keyboard key value mapping table of the terminal Optionally, the mapping relationship acquiring module 601 specifically includes:

a terminal information acquiring unit 6011, configured to acquire terminal identifiers, and virtual keyboard key value mapping tables corresponding to the terminal identifiers; and a unit 6012 for generating a universal virtual keyboard key value mapping table, configured to generate a mapping relationship between terminals and universal virtual keyboard key value mapping tables according to the virtual keyboard key value mapping tables.

When the mapping relationship between terminals and universal virtual keyboard key value mapping tables is specifically a mapping relationship between terminal identifiers and universal virtual keyboard key value mapping table identifiers, the universal virtual keyboard information sending module 602 specifically includes:

an acquisition request receiving unit 6021, configured to receive a request for acquiring a universal virtual keyboard key value mapping table from the terminal, where the request carries the universal virtual keyboard key value mapping table identifier corresponding to the identifier of the terminal; and a unit 6022 for sending a universal virtual keyboard key value mapping table, configured to send a universal virtual keyboard key value mapping table corresponding to the universal virtual keyboard key value mapping table identifier corresponding to the identifier of the terminal to the terminal.

Optionally, the mapping relationship between terminals and universal virtual keyboard key value mapping tables is specifically a mapping relationship between terminal identifiers and universal virtual keyboard key value mapping table identifiers.

Optionally, the server further includes:

an input method sending module 603, configured to send an input method corresponding to the universal virtual keyboard key value mapping table; and/or a picture information sending module 604, configured to send picture information corresponding to each of the key values in the universal virtual keyboard key value mapping table to the terminal;

an update request receiving module 605, configured to receive a request for updating the mapping relationship between terminals and universal virtual keyboard key value mapping tables from the terminal; and an updated mapping relationship sending module 606, configured to: when an updated mapping relationship between terminals and universal virtual keyboard key value mapping tables is available, send the updated mapping relationship between terminals and universal virtual keyboard key value mapping tables to the terminal to enable the terminal to replace a locally stored mapping relationship between terminals and universal virtual keyboard key value mapping tables with the updated mapping relationship between terminals and universal virtual keyboard key value mapping tables.

The server and the terminal, as two execution subjects, perform corresponding operations. The details about performing operations by the server are described in the above terminal embodiment. The server provided in this embodiment is based on the same inventive concept as the method embodiment 2. Therefore, the detailed implementation can refer to the description of the method embodiments of the present invention, which is not described herein any further.

A person skilled in the art should understand that all or part of steps of the preceding methods may be implemented by hardware or hardware following instructions of programs. The programs may be stored in a computer readable storage medium. The storage medium may be a read only memory, a magnetic disk, or a compact disc-read only memory.

Embodiment 8

Figure 8:
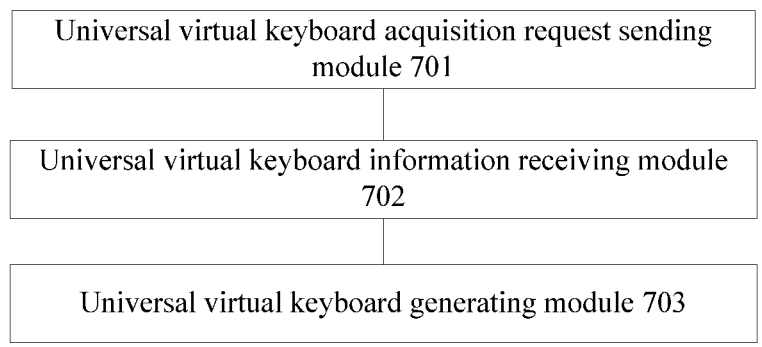
FIG. 8 is a schematic structural diagram of a terminal according to Embodiment 8 of the present invention.

As illustrated in FIG. 8, this embodiment provides a terminal, where the terminal includes:

a universal virtual keyboard acquisition request sending module 701, configured to send a request for acquiring a universal virtual keyboard, where the request carries the identifier of a terminal;

a universal virtual keyboard information receiving module 702, configured to receive layout of a universal virtual keyboard, and a universal virtual keyboard key value mapping table corresponding to the identifier of the terminal from a server; and a universal virtual keyboard generating module 703, configured to acquire a universal virtual keyboard according to the layout of the universal virtual keyboard and the universal virtual keyboard key value mapping table of the terminal.

According to the embodiments of the present invention, a terminal directly sends the identifier of the terminal to a server, and the server sends a universal virtual keyboard key value mapping table corresponding to the identifier of the terminal to the terminal. In this way, the number of attempts to establishing communication between the terminal and the server, thereby saving communication traffic, and improving user experience.

The terminal provided in this embodiment is based on the same inventive concept as the method embodiment 3. Therefore, the detailed implementation can refer to the description of the method embodiments of the present invention, which is not described herein any further.

A person skilled in the art should understand that all or part of steps of the preceding methods may be implemented by hardware or hardware following instructions of programs. The programs may be stored in a computer readable storage medium. The storage medium may be a read only memory, a magnetic disk, or a compact disc-read only memory.

Embodiment 9

Figure 9:
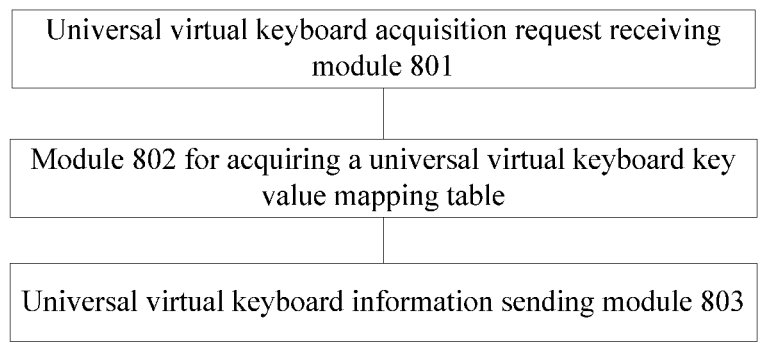
FIG. 9 is a schematic structural diagram of a server according to Embodiment 9 of the present invention.

As illustrated in FIG. 9, this embodiment provides a server, where the server includes:

a universal virtual keyboard acquisition request receiving module 801, configured to receive a request for acquiring a universal virtual keyboard from a terminal, where the request carries the identifier of the terminal;

a module 802 for acquiring a universal virtual keyboard key value mapping table, configured to query a mapping relationship between terminal identifiers and universal virtual keyboard key value mapping tables according to the identifier of the terminal to acquire a universal virtual keyboard key value mapping table corresponding to the identifier of the terminal; and a universal virtual keyboard information sending module 803, configured to send layout of the universal virtual keyboard and the universal virtual keyboard key value mapping table corresponding to the identifier of the terminal to enable the terminal to acquire a universal virtual keyboard according to the layout of the universal virtual keyboard and the universal virtual keyboard key value mapping table of the terminal.

According to the embodiments of the present invention, a terminal directly sends the identifier of the terminal to a server, and the server sends a universal virtual keyboard key value mapping table corresponding to the identifier of the terminal to the terminal. In this way, the number of attempts to establishing communication between the terminal and the server, thereby saving communication traffic, and improving user experience.

The server and the terminal, as two execution subjects, perform corresponding operations. The details about performing operations by the server are described in the above terminal embodiment. The server provided in this embodiment is based on the same inventive concept as the method embodiment 3. Therefore, the detailed implementation can refer to the description of the method embodiments of the present invention, which is not described herein any further.

A person skilled in the art should understand that all or part of steps of the preceding methods may be implemented by hardware or hardware following instructions of programs. The programs may be stored in a computer readable storage medium. The storage medium may be a read only memory, a magnetic disk, or a compact disc-read only memory.

Embodiment 10

Figure 10:
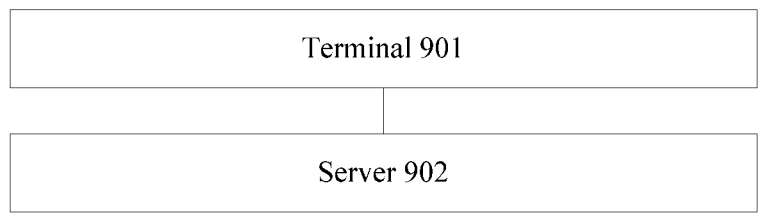
FIG. 10 is a flowchart of a system for acquiring a virtual keyboard according to Embodiment 10 of the present invention.

As illustrated in FIG. 10, this embodiment of the present invention provides a system for acquiring a virtual keyboard, where the system includes a terminal 901 and a server 902.

The terminal 901 is configured to: receive layout of a universal virtual keyboard and a mapping relationship between terminals and universal virtual keyboard key value mapping tables from the server; acquire a corresponding universal virtual keyboard key value mapping table according to the identifier of the terminal and the mapping relationship between terminals and universal virtual keyboard key value mapping tables; and acquire a universal virtual keyboard according to the layout of the universal virtual keyboard and the universal virtual keyboard key value mapping table of the terminal.

The server 902 is configured to: acquire a preset mapping relationship between terminals and universal virtual keyboard key value mapping tables; and send the layout of the universal virtual keyboard and the mapping relationship between terminals and universal virtual keyboard key value mapping tables to the terminal to enable the terminal to acquire a corresponding universal virtual keyboard key value mapping table according to the identifier of the terminal and the mapping relationship between terminals and universal virtual keyboard key value mapping tables.

According to the embodiments of the present invention, a universal virtual keyboard key value mapping table of a terminal is acquired according to the identifier of the terminal and a mapping relationship between terminals and universal virtual keyboard key value mapping tables, and a universal virtual keyboard is acquired according to layout of the virtual keyboard and the universal virtual keyboard key value mapping table of the terminal. In this way, virtual keyboards of different terminals have uniform user interface display, thereby reducing operation costs of users to adapt different virtual keyboards due to use of different terminals, and improving user experience.

The system provided in this embodiment is based on the same inventive concept as the method embodiments. Therefore, the detailed implementation can refer to the description of the method embodiments of the present invention, which is not described herein any further.

A person skilled in the art should understand that all or part of steps of the preceding methods may be implemented by hardware or hardware following instructions of programs. The programs may be stored in a computer readable storage medium. The storage medium may be a read only memory, a magnetic disk, or a compact disc-read only memory.

Described above are merely preferred embodiments of the present invention, but are not intended to limit the present invention. Any modification, equivalent replacement, or improvement made without departing from the spirit and principle of the present invention should fall within the protection scope of the present invention.

What is claimed is:

1. A method for acquiring a virtual keyboard, comprising:
   receiving, by a terminal, layout of a universal virtual keyboard, and a mapping relationship between terminals and universal virtual keyboard key value mapping tables from a server, the universal virtual keyboard being a virtual keyboard with the same layout when being displayed in any model of terminal;
   acquiring, by the terminal, a universal virtual keyboard key value mapping table of a terminal according to an identifier of the terminal and the mapping relationship between terminals and universal virtual keyboard key value mapping tables; and
   generating, by the terminal, a universal virtual keyboard according to the layout of the universal virtual keyboard and the universal virtual keyboard key value mapping table of the terminal.

2. The method according to claim 1, wherein when the mapping relationship between terminals and universal virtual keyboard key value mapping tables is specifically a mapping relationship between terminal identifiers and universal virtual keyboard key value mapping table identifiers, the acquiring a universal virtual keyboard key value mapping table of a terminal according to the identifier of the terminal and the mapping relationship between terminals and universal virtual keyboard key value mapping tables specifically comprises:
   acquiring the identifier of the terminal, and querying the mapping relationship between terminal identifiers and universal virtual keyboard key value mapping table identifiers according to the identifier of the terminal to acquire a universal virtual keyboard key value mapping table identifier corresponding to the identifier of the terminal;
   sending a request for acquiring a universal virtual keyboard key value mapping table to the server, wherein the request carries the universal virtual keyboard key value mapping table identifier corresponding to the identifier of the terminal; and
   receiving a universal virtual keyboard key value mapping table corresponding to the universal virtual keyboard key value mapping table identifier corresponding to the identifier of the terminal from the server.

3. The method according to claim 1, wherein when the mapping relationship between terminals and universal virtual keyboard key value mapping tables is specifically a mapping relationship between terminal identifiers and universal virtual keyboard key value mapping tables, the acquiring a universal virtual keyboard key value mapping table of a terminal according to the identifier of the terminal and the mapping relationship between terminals and universal virtual keyboard key value mapping tables specifically comprises:
   acquiring the identifier of the terminal, and querying the mapping relationship between terminal identifiers and universal virtual keyboard key value mapping tables according to the identifier of the terminal to acquire a universal virtual keyboard key value mapping table corresponding to the identifier of the terminal.

4. The method according to claim 1, wherein when the universal virtual keyboard key value mapping table of the terminal does not exist in the mapping relationship between terminals and universal virtual keyboard key value mapping tables, prior to the acquiring a universal virtual keyboard key value mapping table of a terminal according to the identifier of the terminal and the mapping relationship between terminals and universal virtual keyboard key value mapping tables, the method further comprises:
   sending a request for updating the mapping relationship between terminals and universal virtual keyboard key value mapping tables; and
   receiving an updated mapping relationship between terminals and universal virtual keyboard key value mapping tables from the server, and replacing a locally stored mapping relationship between terminals and universal virtual keyboard key value mapping tables with the updated mapping relationship between terminals and universal virtual keyboard key value mapping tables.

5. The method according to claim 1, wherein after the generating a universal virtual keyboard according to the layout of the universal virtual keyboard and the universal virtual keyboard key value mapping table of the terminal, the method further comprises:
   acquiring a key-press event generated by a user when pressing a key on the universal virtual keyboard; and
   querying the universal virtual keyboard key value mapping table corresponding to the identifier of the terminal to acquire a key value corresponding to the key-press event, and synchronously caching the key value.

6. The method according to claim 1, wherein after the generating a universal virtual keyboard according to the layout of the universal virtual keyboard and the universal virtual keyboard key value mapping table of the terminal, the method further comprises:
   acquiring an input method that is carried in and corresponding to the universal virtual keyboard key value mapping table, and/or picture information corresponding to each of the key values in the universal virtual keyboard key value mapping table.

7. A method for sending a virtual keyboard, comprising:
   acquiring, by a server, layout of a universal virtual keyboard, and a preset mapping relationship between terminals and universal virtual keyboard key value mapping tables, the universal virtual keyboard being a virtual keyboard with the same layout when being displayed in any model of terminal; and sending, by a server, the layout of the universal virtual keyboard and the mapping relationship between terminals and universal virtual keyboard key value mapping tables to a terminal to enable the terminal to acquire a corresponding universal virtual keyboard key value mapping table according to an identifier of the terminal and the mapping relationship between terminals and universal virtual keyboard key value mapping tables, and generate a universal virtual keyboard according to the layout of the universal virtual keyboard and the universal virtual keyboard key value mapping table of the terminal.

8. The method according to claim 7, wherein the acquiring a preset mapping relationship between terminals and universal virtual keyboard key value mapping tables specifically comprises:

acquiring terminal identifiers, and virtual keyboard key value mapping tables corresponding to the terminal identifiers; and generating a mapping relationship between terminals and universal virtual keyboard key value mapping tables according to the virtual keyboard key value mapping tables.

9. The method according to claim 7, wherein when the mapping relationship between terminals and universal virtual keyboard key value mapping tables is specifically a mapping relationship between terminal identifiers and universal virtual keyboard key value mapping table identifiers, the enabling the terminal to acquire a universal virtual keyboard key value mapping table of a terminal according to the identifier of the terminal and the mapping relationship between terminals and universal virtual keyboard key value mapping tables specifically comprises:

enabling the terminal to acquire the identifier of the terminal, and query the mapping relationship between terminal identifiers and universal virtual keyboard key value mapping table identifiers according to the identifier of the terminal to acquire a universal virtual keyboard key value mapping table identifier corresponding to the identifier of the terminal;

receiving a request for acquiring a universal virtual keyboard key value mapping table from the server, wherein the request carries the universal virtual keyboard key value mapping table identifier corresponding to the identifier of the terminal; and sending the universal virtual keyboard key value mapping table corresponding to the universal virtual keyboard key value mapping table identifier to the terminal.

10. The method according to claim 7, wherein the mapping relationship between terminals and universal virtual keyboard key value mapping tables is specifically a mapping relationship between terminal identifiers and universal virtual keyboard key value mapping tables.

11. The method according to claim 7, further comprising:

sending an input method corresponding to the universal virtual keyboard key value mapping table, and/or picture information corresponding to each of the key values in the universal virtual keyboard key value mapping table to the terminal.

12. The method according to claim 8, wherein when the universal virtual keyboard key value mapping table of the terminal does not exist in the mapping relationship between terminals and universal virtual keyboard key value mapping tables, prior to the enabling the terminal to acquire a universal virtual keyboard key value mapping table of a terminal according to the identifier of the terminal and the mapping relationship between terminals and universal virtual keyboard key value mapping tables, the method further comprises:

receiving a request for updating the mapping relationship between terminals and universal virtual keyboard key value mapping tables from the terminal; and when an updated mapping relationship between terminals and universal virtual keyboard key value mapping tables is available, sending the updated mapping relationship between terminals and universal virtual keyboard key value mapping tables to the terminal to enable the terminal to replace a locally stored mapping relationship between terminals and universal virtual keyboard key value mapping tables with the updated mapping relationship between terminals and universal virtual keyboard key value mapping tables.

13. A method for acquiring a virtual keyboard, comprising:

sending, by a terminal, a universal virtual keyboard acquisition request, wherein the request carries an identifier of a terminal;

receiving, by the terminal, layout of a universal virtual keyboard, and a universal virtual keyboard key value mapping table corresponding to the identifier of the terminal from a server, the universal virtual keyboard being a virtual keyboard with the same layout when being displayed in any model of terminal; and generating, by the terminal, a universal virtual keyboard according to the layout of the universal virtual keyboard, and the universal virtual keyboard key value mapping table of the terminal.

14. A method for sending a virtual keyboard, comprising:

receiving, by a server, a universal virtual keyboard acquisition request from a terminal, wherein the request carries an identifier of the terminal;

querying, by the server, the mapping relationship between terminal identifiers and universal virtual keyboard key value mapping tables according to the identifier of the terminal to acquire a universal virtual keyboard key value mapping table corresponding to the identifier of the terminal; and sending, by the server, the layout of the universal virtual keyboard and the universal virtual keyboard key value mapping table corresponding to the identifier of the terminal to enable the terminal to generating a universal virtual keyboard according to the layout of the universal virtual keyboard and the universal virtual keyboard key value mapping table of the terminal, the universal virtual keyboard being a virtual keyboard with the same layout when being displayed in any model of terminal.

15. A terminal, comprising: one or more processors; and a memory for storing a program, wherein the program, when being executed by the one or more processors, causes the terminal to perform the following operations:

receiving layout of a universal virtual keyboard, and a mapping relationship between terminals and universal virtual keyboard key value mapping tables from a server, the universal virtual keyboard being a virtual keyboard with the same layout when being displayed in any model of terminal;

acquiring a universal virtual keyboard key value mapping table of a terminal according to an identifier of the terminal and the mapping relationship between terminals and universal virtual keyboard key value mapping tables; and generating a universal virtual keyboard according to the layout of the universal virtual keyboard and the universal virtual keyboard key value mapping table of the terminal.

16. The terminal according to claim 15, wherein the program comprises instructions for performing the following operations:
  acquiring the identifier of the terminal, and querying the mapping relationship between terminal identifiers and universal virtual keyboard key value mapping table identifiers according to the identifier of the terminal to acquire a universal virtual keyboard key value mapping table identifier corresponding to the identifier of the terminal, when the mapping relationship between terminals and universal virtual keyboard key value mapping tables is specifically a mapping relationship between terminal identifiers and universal virtual keyboard key value mapping table identifiers;
  sending a request for acquiring a universal virtual keyboard key value mapping table to the server, wherein the request carries the universal virtual keyboard key value mapping table identifier corresponding to the identifier of the terminal; and
  receiving a universal virtual keyboard key value mapping table corresponding to the universal virtual keyboard key value mapping table identifier corresponding to the identifier of the terminal from the server.

17. The terminal according to claim 15, wherein the program comprises instructions for performing the following operations:
  acquiring the identifier of the terminal, and query the mapping relationship between terminal identifiers and universal virtual keyboard key value mapping tables according to the identifier of the terminal to acquire a universal virtual keyboard key value mapping table corresponding to the identifier of the terminal, when the mapping relationship between terminals and universal virtual keyboard key value mapping tables is specifically a mapping relationship between terminal identifiers and universal virtual keyboard key value mapping tables.

18. The terminal according to claim 15, wherein the programs include instructions for performing the following operations:
  sending a request for updating the mapping relationship between terminals and universal virtual keyboard key value mapping tables; and
  receiving an updated mapping relationship between terminals and universal virtual keyboard key value mapping tables from the server, and replacing a locally stored mapping relationship between terminals and universal virtual keyboard key value mapping tables with the updated mapping relationship between terminals and universal virtual keyboard key value mapping tables.

19. The terminal according to claim15, wherein the program comprises instructions for performing the following operations:
  acquiring a key-press event generated by a user when pressing a key on the universal virtual keyboard; and
  querying the universal virtual keyboard key value mapping table corresponding to the identifier of the terminal to acquire a key value corresponding to the key-press event, and synchronously caching the key value.

20. The terminal according to claim 15, wherein the program comprises instructions for performing the following operations:
  acquiring an input method that is carried in and corresponding to the universal virtual keyboard key value mapping table; and/or
  acquiring picture information corresponding to each of the key values in the universal virtual keyboard key value mapping table.

21. A server, comprising: one or more processors; and a memory for storing a program, wherein the program, when being executed by the one or more processors, causes the server to perform the following operations:
  acquiring a preset mapping relationship between terminals and universal virtual keyboard key value mapping tables, the universal virtual keyboard being a virtual keyboard with the same layout when being displayed in any model of terminal; and
  sending layout of a universal virtual keyboard and the mapping relationship between terminals and universal virtual keyboard key value mapping tables to a terminal to enable the terminal to acquire a corresponding universal virtual keyboard key value mapping table according to-an identifier of the terminal and the mapping relationship between terminals and universal virtual keyboard key value mapping tables, and generating a universal virtual keyboard according to the layout of the universal virtual keyboard and the universal virtual keyboard key value mapping table of the terminal by the server.

22. The server according to claim 21, wherein the program comprises instructions for performing the following operations:
  acquiring terminal identifiers, and virtual keyboard key value mapping tables corresponding to the terminal identifiers; and
  generating a mapping relationship between terminals and universal virtual keyboard key value mapping tables according to the virtual keyboard key value mapping tables.

23. The server according to claim 21, wherein the program comprises instructions for performing the following operations:
  receiving a request for acquiring a universal virtual keyboard key value mapping table from the terminal, wherein the request carries the universal virtual keyboard key value mapping table identifier corresponding to the identifier of the terminal, when the mapping relationship between terminals and universal virtual keyboard key value mapping tables is specifically a mapping relationship between terminal identifiers and universal virtual keyboard key value mapping table identifiers; and
  sending a universal virtual keyboard key value mapping table corresponding to the universal virtual keyboard key value mapping table identifier corresponding to the identifier of the terminal to the terminal.

24. The server according to claim 21, wherein the mapping relationship between terminals and universal virtual keyboard key value mapping tables is specifically a mapping relationship between terminal identifiers and universal virtual keyboard key value mapping tables.

25. The server according to claim 21, wherein the program comprises instructions for performing the following operations:
  sending an input method corresponding to the universal virtual keyboard key value mapping table; and/or
  sending picture information corresponding to each of the key values in the universal virtual keyboard key value mapping table to the terminal.

26. The server according to claim 22, wherein the program comprises instructions for performing the following operations:
receiving a request for updating the mapping relationship between terminals and universal virtual keyboard key value mapping tables from the terminal; and
when an updated mapping relationship between terminals and universal virtual keyboard key value mapping tables is available, sending the updated mapping relationship between terminals and universal virtual keyboard key value mapping tables to the terminal to enable the terminal to replace a locally stored mapping relationship between terminals and universal virtual keyboard key value mapping tables with the updated mapping relationship between terminals and universal virtual keyboard key value mapping tables.

27. A terminal, comprising: one or more processors; and A memory for storing a program, wherein the program, when being executed by the one or more processors, causes the terminal to perform the following operations:
sending a request for acquiring a universal virtual keyboard, wherein the request carries an identifier of a terminal;
receiving layout of a universal virtual keyboard, and a universal virtual keyboard key value mapping table corresponding to the identifier of the terminal from a server, the universal virtual keyboard being a virtual keyboard with the same layout when being displayed in any model of terminal; and
generating a universal virtual keyboard according to the layout of the universal virtual keyboard and the universal virtual keyboard key value mapping table of the terminal.

28. A server, comprising: one or more processors; and a memory for storing a program, wherein the program, when being executed by the one or more processors, causes the terminal to perform the following operations:
receiving a request for acquiring a universal virtual keyboard from a terminal, wherein the request carries an identifier of the terminal;
querying a mapping relationship between terminal identifiers and universal virtual keyboard key value mapping tables according to the identifier of the terminal to acquire a universal virtual keyboard key value mapping table corresponding to the identifier of the terminal; and
sending layout of the universal virtual keyboard and the universal virtual keyboard key value mapping table corresponding to the identifier of the terminal to enable the terminal to generate a universal virtual keyboard according to the layout of the universal virtual keyboard and the universal virtual keyboard key value mapping table of the terminal, the universal virtual keyboard being a virtual keyboard with the same layout when being displayed in any model of terminal.

29. A system for acquiring a virtual keyboard, comprising at least one terminal and a server; wherein
the terminal is configured to: receive layout of a universal virtual keyboard and a mapping relationship between terminals and universal virtual keyboard key value mapping tables from the server; acquire a corresponding universal virtual keyboard key value mapping table according to an identifier of the terminal and the mapping relationship between terminals and universal virtual keyboard key value mapping tables; and generate a universal virtual keyboard according to the layout of the universal virtual keyboard and the universal virtual keyboard key value mapping table of the terminal, the universal virtual keyboard being a virtual keyboard with the same layout when being displayed in any model of terminal; and
the server is configured to: acquire a preset mapping relationship between terminals and universal virtual keyboard key value mapping tables; and send the layout of the universal virtual keyboard and the mapping relationship between terminals and universal virtual keyboard key value mapping tables to the terminal to enable the terminal to generate a corresponding universal virtual keyboard key value mapping table according to the identifier of the terminal and the mapping relationship between terminals and universal virtual keyboard key value mapping tables.

* * * * *